(12) United States Patent
Altknecht et al.

(10) Patent No.: US 9,741,390 B1
(45) Date of Patent: Aug. 22, 2017

(54) OPTICAL DISC DRIVE

(71) Applicant: International Business Machines Corporation, Armonk, NY (US)

(72) Inventors: David J. Altknecht, San Jose, CA (US); John S. Best, San Jose, CA (US); Donald S. Bethune, San Jose, CA (US); William M. Dyer, San Jose, CA (US); A. David Erpelding, San Jose, CA (US); Steven R. Hetzler, Los Altos, CA (US); Drew B. Lawson, Aptos, CA (US); Daniel F. Smith, Felton, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/078,857

(22) Filed: Mar. 23, 2016

(51) Int. Cl.
*G11B 17/22* (2006.01)

(52) U.S. Cl.
CPC .................... *G11B 17/225* (2013.01)

(58) Field of Classification Search
CPC .................................................. G11B 17/225
USPC ...... 369/30.58, 30.59, 30.88, 30.89; 720/615
See application file for complete search history.

(56) References Cited

U.S. PATENT DOCUMENTS

| | | | | |
|---|---|---|---|---|
| 4,633,452 A | * | 12/1986 | Shimbo | G11B 17/30 369/30.83 |
| 4,695,990 A | * | 9/1987 | Kawakami | G11B 17/04 369/30.78 |
| 4,815,057 A | * | 3/1989 | Miller | G11B 17/24 369/198 |
| 4,901,172 A | * | 2/1990 | Nakazawa | G11B 17/226 360/98.04 |
| 4,989,191 A | | 1/1991 | Kuo | |
| 5,067,116 A | * | 11/1991 | Kadrmas | G11B 17/24 369/30.77 |
| 5,136,562 A | * | 8/1992 | Staar | G11B 17/30 360/98.01 |
| 5,207,727 A | | 5/1993 | Pearce et al. | |
| 5,253,911 A | | 10/1993 | Egan et al. | |
| 5,274,620 A | | 12/1993 | Sipos | |
| 5,289,441 A | * | 2/1994 | Domberg | G11B 17/225 360/98.06 |

(Continued)

FOREIGN PATENT DOCUMENTS

| | | |
|---|---|---|
| CN | 102598136 A | 7/2012 |
| CN | 204149156 U | 2/2015 |

(Continued)

OTHER PUBLICATIONS

Watanabe, A et al., "Optical library system for Long-term preservation with extended error correction coding", Proceedings of the IEEE Symposium on Massive Storage Systems and Technologies, 2013, pp. 1-18, IEEE Computer Society, United States.

(Continued)

*Primary Examiner* — Brian Miller
(74) *Attorney, Agent, or Firm* — Sherman IP LLP; Kenneth L. Sherman; Steven Laut

(57) ABSTRACT

An optical disc drive includes a spindle connected to an optical assembly. A disc clamp device is configured to hold an optical disc on the spindle. A contiguous opening on at least two adjacent sides in a plane of a disc mount position intersect at a common corner of the optical disc drive.

15 Claims, 11 Drawing Sheets

(56) References Cited

U.S. PATENT DOCUMENTS

| | | | |
|---|---|---|---|
| 5,292,222 A | 3/1994 | Malagrino et al. | |
| 5,481,514 A * | 1/1996 | Yamasaki | G11B 17/26 360/98.06 |
| 5,528,566 A | 6/1996 | McGee et al. | |
| 5,544,148 A * | 8/1996 | Nakamichi | G11B 17/30 360/98.07 |
| 5,550,801 A | 8/1996 | Enomoto et al. | |
| 5,555,239 A * | 9/1996 | Takai | G11B 17/30 369/30.74 |
| 5,586,094 A * | 12/1996 | Pines | G11B 17/28 369/30.85 |
| 5,588,796 A | 12/1996 | Ricco | |
| 5,610,902 A | 3/1997 | Childers et al. | |
| 5,631,785 A | 5/1997 | Dang et al. | |
| 5,726,967 A * | 3/1998 | Tanaka | G11B 17/26 369/30.78 |
| 5,729,524 A | 3/1998 | Pines | |
| 5,754,519 A * | 5/1998 | Bando | G11B 17/30 369/30.85 |
| 5,764,617 A * | 6/1998 | Furusawa | G11B 17/30 360/98.06 |
| 5,798,998 A | 8/1998 | Fukushima | |
| 5,805,561 A | 9/1998 | Pollard | |
| 5,923,638 A * | 7/1999 | Watanabe | G11B 17/28 369/30.85 |
| 5,953,293 A * | 9/1999 | Kajiyama | G11B 17/24 369/30.79 |
| 5,959,958 A * | 9/1999 | Inatani | G11B 17/28 369/30.85 |
| 5,978,323 A | 11/1999 | Nakamura | |
| 6,064,544 A | 5/2000 | Wada | |
| 6,084,832 A | 7/2000 | Furusawa et al. | |
| 6,122,231 A | 9/2000 | Watanabe et al. | |
| 6,212,139 B1 | 4/2001 | Nakamura et al. | |
| 6,373,796 B1 * | 4/2002 | Herring | G11B 17/28 369/36.01 |
| 6,454,509 B1 | 9/2002 | Kappel et al. | |
| 6,493,178 B1 | 12/2002 | Brace et al. | |
| 6,587,405 B1 | 7/2003 | Klein | |
| 6,683,827 B1 | 1/2004 | Omoto et al. | |
| 6,731,455 B2 | 5/2004 | Kulakowski et al. | |
| 6,802,070 B2 | 10/2004 | Britz et al. | |
| 7,145,841 B1 | 12/2006 | Miller | |
| 7,193,810 B2 | 3/2007 | Dickey et al. | |
| 7,212,375 B2 | 5/2007 | Dickey | |
| 7,234,913 B2 | 6/2007 | Heiland et al. | |
| 7,673,309 B2 | 3/2010 | Douglas et al. | |
| 7,777,985 B2 | 8/2010 | Barkley | |
| 8,041,449 B2 | 10/2011 | Noble | |
| 8,134,799 B1 | 3/2012 | Ostwald | |
| 8,276,170 B2 | 9/2012 | Douglass et al. | |
| 8,281,327 B2 | 10/2012 | Goto et al. | |
| 8,341,653 B2 | 12/2012 | Terzis et al. | |
| 8,385,163 B2 | 2/2013 | Goyal et al. | |
| 8,701,862 B2 | 4/2014 | Takasawa et al. | |
| 8,824,250 B2 | 9/2014 | Yoo | |
| 8,899,406 B2 | 12/2014 | Nespeca | |
| 9,230,591 B2 | 1/2016 | Kinoshita et al. | |
| 9,428,336 B2 | 8/2016 | Hagen et al. | |
| 2003/0117938 A1 | 6/2003 | Braitberg et al. | |
| 2004/0080852 A1 | 4/2004 | Jenkins et al. | |
| 2005/0007896 A1 | 1/2005 | Haas | |
| 2006/0005209 A1 | 1/2006 | Chiang | |
| 2006/0021896 A1 | 2/2006 | Cleathero et al. | |
| 2006/0136950 A1 | 6/2006 | Eberdorfer | |
| 2007/0127323 A1 | 6/2007 | Owens | |
| 2013/0256164 A1 | 10/2013 | Haggard | |

FOREIGN PATENT DOCUMENTS

| | | |
|---|---|---|
| EP | 1653461 A2 | 3/2006 |
| WO | 2010005624 A1 | 1/2010 |
| WO | 2014076978 A1 | 5/2014 |

OTHER PUBLICATIONS

International Search Report and Written Opinion dated Apr. 28, 2017 for International Application No. PCT/IB2017/0505592, pp. 1-12, State Intellectual Property Office of the P.R. China, Beijing, China.

* cited by examiner

OPTICAL DISC DRIVE

BACKGROUND

Disc libraries require a disc retrieval unit (DRU) to move discs between storage locations and the drives that read and write the data on the discs. This DRU must incorporate means to obtain a disc at a pickup location and release the disc at its destination location.

SUMMARY

Embodiments relate to optical disc drives in disc storage systems. In one embodiment, an optical disc drive includes a spindle connected to an optical assembly. A disc clamp device is configured to hold an optical disc on the spindle. A contiguous opening on at least two adjacent sides in a plane of a disc mount position intersect at a common corner of the optical disc drive.

These and other features, aspects and advantages of the present invention will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more embodiments include an optical disc drive that includes a spindle connected to an optical assembly. A disc clamp device is configured to hold an optical disc on the spindle. A contiguous opening on at least two adjacent sides in a plane of a disc mount position intersect at a common corner of the optical disc drive.

Figure 1:
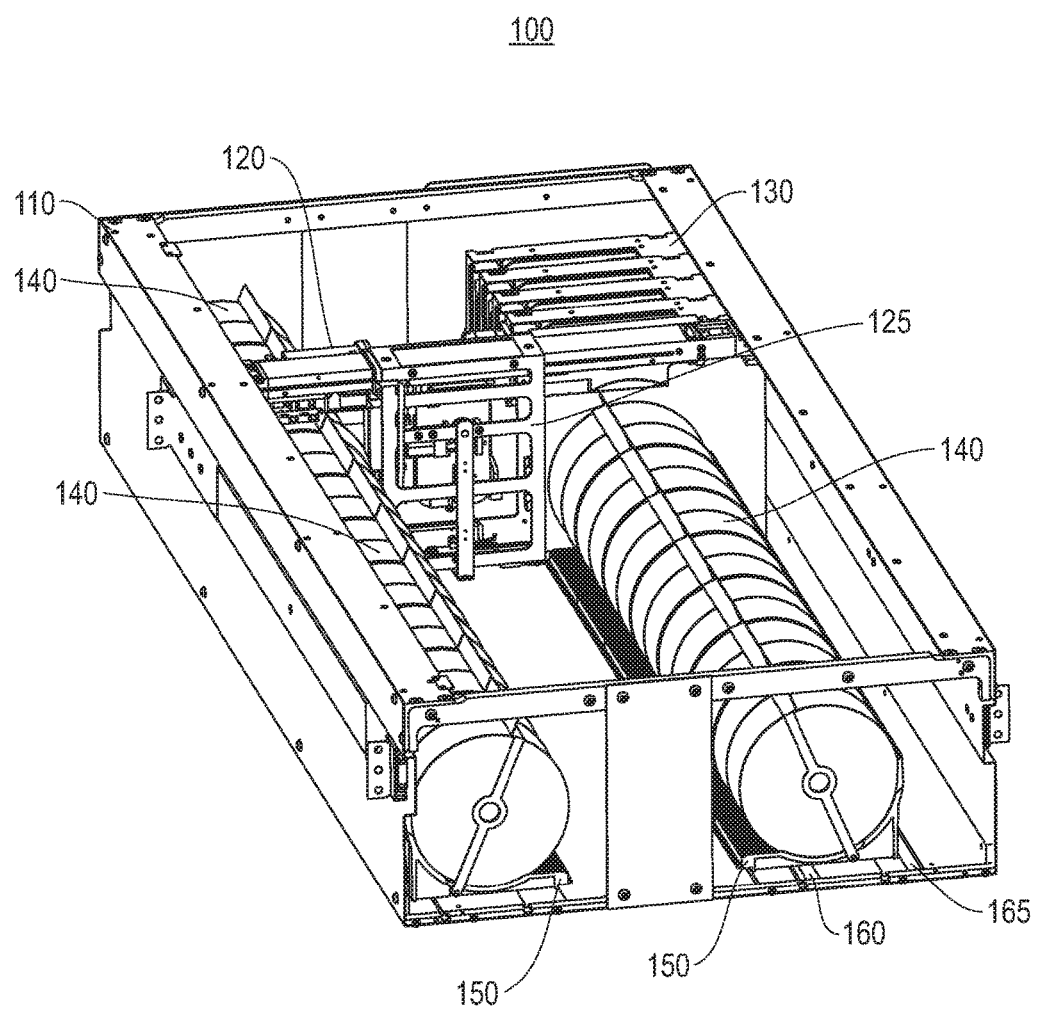
FIG. 1 is a high performance optical storage system that may implement an optical disc drive, according to an embodiment.

One or more embodiments provide an optical disc drive for use in a high performance optical storage system (e.g., the high performance optical storage system 100, FIG. 1). One embodiment enables a compact and simple robot or disc retrieval unit (DRU), and high density packing of the optical disc drives 130, thus improving the cost and performance of an optical storage system comprising these optical disc drives 130 (e.g., the high performance optical storage system 100, FIG. 1). Typical optical disc drives perform load operations from one side of the drive, only. In one type of optical disc drive, the optical disc drive includes a tray that moves in and out of the optical disc drive. In another type of optical disc drive, the disc is partially inserted into a slot in the optical disc drive, and internal mechanisms of the optical disc drive complete loading and unloading of the disc. Another type of optical disc drive is only applicable to manual loading of the optical disc drive, and uses a tilting lift cover on the optical disc drive to allow a disc to be manually delivered to the spindle. Another type of optical disc drive used in portable applications has the entire spindle assembly mounted on a tray that slides in and out of the drive enclosure. In an automated system, each of these typical optical disc drive types requires a robot mechanism that rotates the plane of a disc, or needs multiple, different actions from different directions to load, hold, and drop off a disc 140 (FIG. 1) at a storage location and at an optical disc drive 130. The complex robot mechanism required to support these typical drive types is therefore large, expensive and slow. Distinguishable from the typical types of optical disc drives, one embodiment achieves high performance and dense packing of discs utilizing a DRU or robot and disc gripper (or robotic gripper) mechanism that delivers the disc directly to the spindle mount position in an optical disc drive 130 (FIG. 1). This requires one or more openings or a contiguous opening in the drive case to allow the disc gripper device 320 (FIG. 3) access to the optical disc drive 130 internal components as the disc is inserted into the optical disc drive 130.

FIG. 1 is a high performance optical storage system 100 that may implement an optical disc drive 130, according to an embodiment. In one embodiment, the high performance optical storage system 100 includes an enclosure 110, a moveable arm 120 connected to a DRU 125 that includes a disc gripper device 320 (FIG. 3), multiple optical disc drives 130, multiple optical disc-based media (discs) 140, disc cassettes 150, and tracks 160 and 165 that hold the disc cassettes 150 in place. In one embodiment, the enclosure 110 provides a stable platform and protection from the environment. In one example, the enclosure includes filter material connected to cooling fans (not shown) and a top enclosure (not shown for internal viewing). In one embodiment, the enclosure may be sized as a typical 19-inch rack mounted device with rack mounting connectors. Depending on the space and enclosure size chosen, the enclosure 110 may have a greater capacity of optical disc drives 130, disc cassettes 150, and thus, discs 140. In one example, the disc cassettes 150 are placed within the enclosure 110 on either side (e.g., left and right sides) of the enclosure 110. In one example, additional disc cassettes 150 and discs 140 space is available adjacent the optical disc drives 130 (e.g., towards the front of the enclosure 110). In wider enclosures 110, more optical disc drives 130 may be positioned adjacent each other on the left and right side of the enclosure 110 when more available space for optical disc drives 130 is available. In one embodiment, the moveable arm 120 moves using motors and gears on tracks within the enclosure 110 to move the DRU 125 from the back of the enclosure 110 to the front of the enclosure 110. The DRU 125 is moveable to either side of the enclosure 110 to retrieve a disc 140 using the disc gripper device 320 for placement in an optical disc drive 130 or for replacement back to a disc cassette 150. In other embodiments, other configurations of stored discs 140 and the DRU 125 may be used for employment of the optical disc drive 130.

In one embodiment, the disc gripper device 320 includes a pair of jaw devices that are shaped to contact only a thin sector close to the edge of a storage disc 140, and slide towards or away from each other. The jaw devices are driven closer together by calipers on the outer surfaces of the jaw devices.

Figure 2:
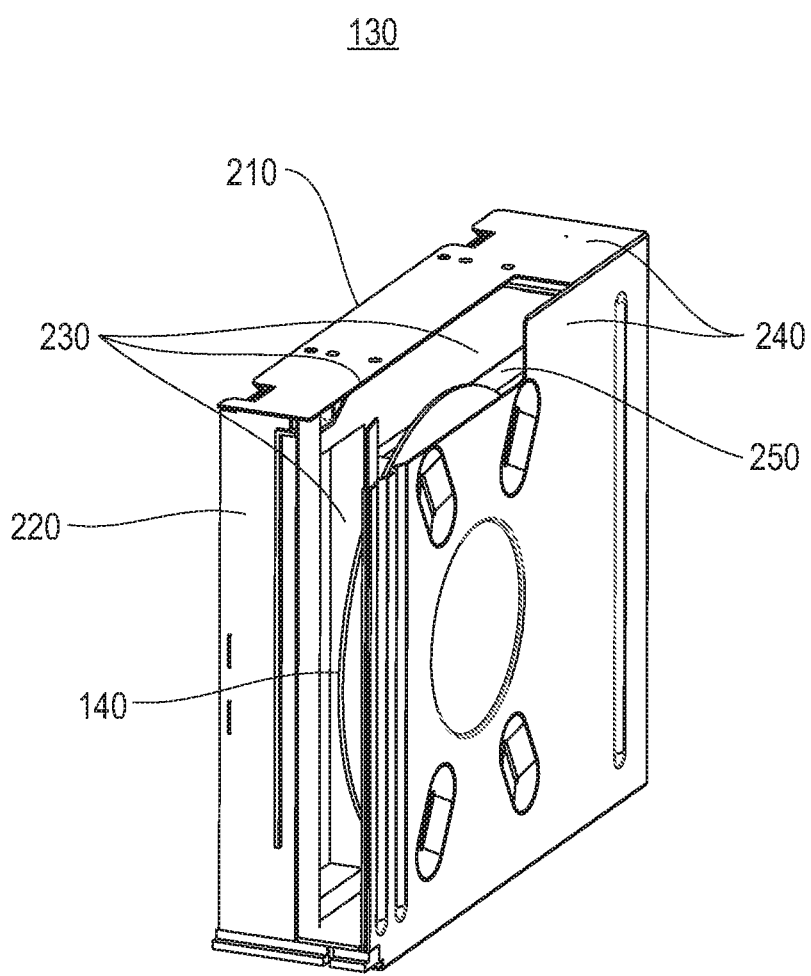
FIG. 2 shows an optical disc drive, according to an embodiment.

FIG. 2 shows an optical disc drive 130 in a vertical orientation, according to an embodiment. The term top will be used herein to refer to the side of the drive which is on the top when the drive is vertically oriented. The optical drive 130 includes a top side 210, a front side 220, a contiguous opening 230 and cover 240. In one embodiment, the contiguous opening is formed on at least two adjacent sides (e.g., the top side 210 and the front side 220) and intersects a corner of the optical disc drive 130 in a plane of a disc 140 mount or disc 140 load position in the optical disc drive 130. In one example, the contiguous opening 230 may be considered as a front opening on the front side 220 and a top opening on the top side 210. The drive may further include an opening portion 250 of the side surface opposite the spindle 330 (FIG. 3).

Figure 3:
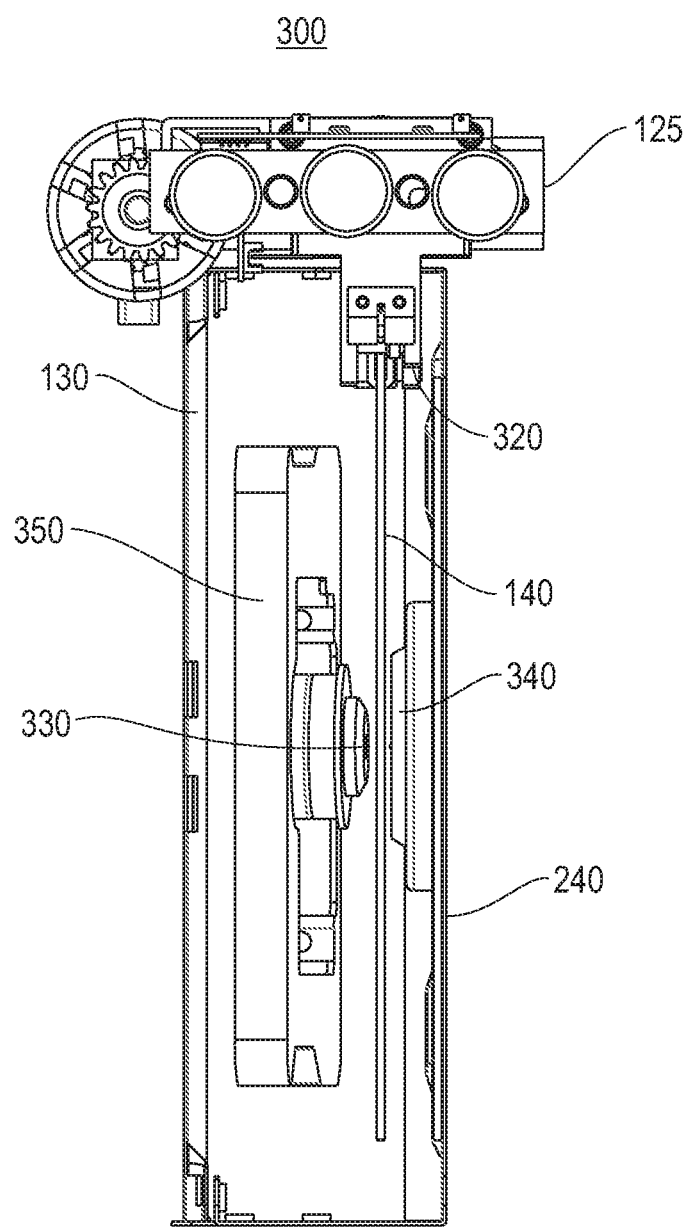
FIG. 3 shows a front side view of the optical disc drive of FIG. 2 with a disc retrieval unit (DRU), according to an embodiment.

FIG. 3 shows a front side view 300 of the optical disc drive 130 of FIG. 2 with a DRU 125, according to an embodiment. The front side view 300 shows the axis along which the disc 140 travels from the disc gripper device 320 to enter and exit the optical disc drive 130. The DRU 125 includes the disc gripper device 320 that actuates to grip a disc 140 for picking up and dropping off a disc from one position (e.g., a disc cassette 150) in the high performance optical storage system 100 (FIG. 1) to or from a particular optical disc drive 130. In one embodiment, the optical drive 130 includes a spindle 330, clamp (device/mechanism) 340 and optical drive assembly 350 (i.e., inner components for reading/writing data from/to a disc 140). The clamp 340 holds an optical disc 140 on the spindle 330.

In one embodiment, the clamp 340 of the optical disc drive 130 may be a magnetic clamp mechanism contained in the drive cover 240, and the spindle 330 and optical drive assembly 350 may be a moving mechanism to engage the disc 140 and clamp mechanism. In another embodiment, the clamp 340 is moveable to engage a fixed spindle 330 and optical drive assembly 350. In yet another embodiment, both the clamp 340 and the spindle 330 and optical drive assembly 350 are moveable to engage a disc 140. One advantage of the embodiments over the typical systems is that the optical disc drive 130 enables the use of a compact robotic mechanism (e.g., DRU 125) that requires only two degrees of freedom to transport discs 140 between a disc cassette 150 (FIG. 1) and the optical disc drive 130, and does not extend significantly above the height of a vertically oriented optical disc drive 130.

Figure 4:
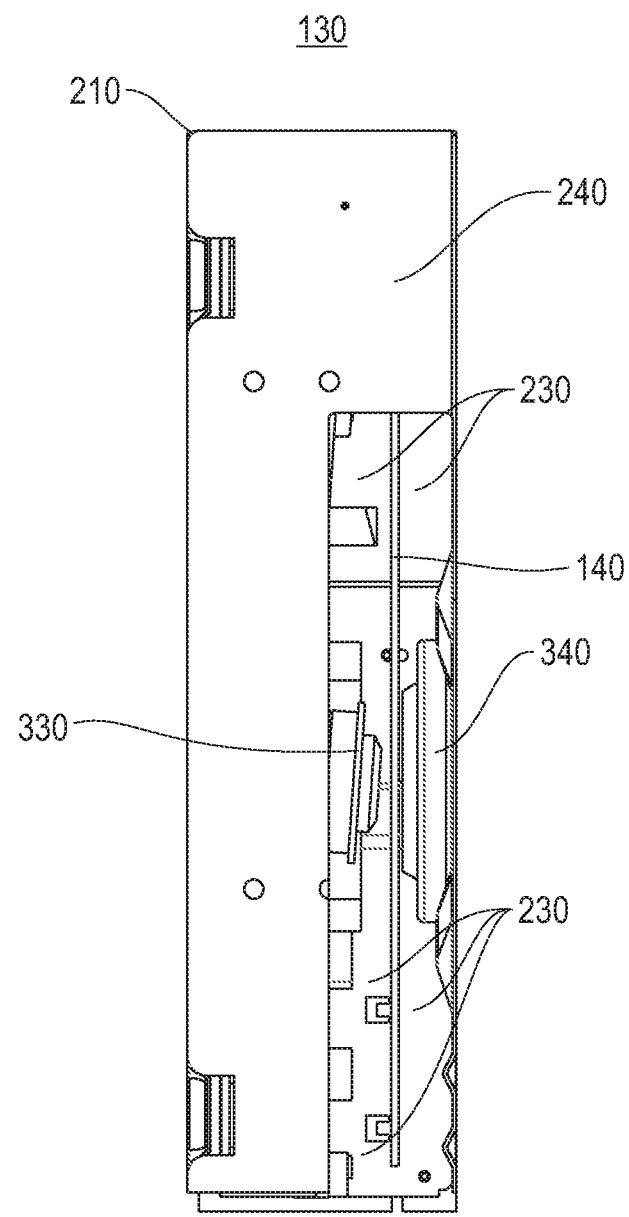
FIG. 4 shows a top side view of the optical disc drive of FIG. 2, according to an embodiment.

FIG. 4 shows a top side 210 view of the optical disc drive 130 of FIG. 2, according to an embodiment. The view of FIG. 4 shows a view from the adjacent side that provides clearance for the disc gripper device 320 holding the disc 140 as it moves the disc 140 in and out of the optical disc drive 140. In one embodiment, in an optical disc storage system such as the high performance optical storage system 100 (FIG. 1), discs 140 are arranged in one or more disc cassettes 150, with both discs 140 and optical disc drives 130 oriented vertically. To load a disc 140 into an optical disc drive 130, the DRU 125 is moved in the direction perpendicular to the plane of the discs 140 (referred to herein as the "Y" direction), so that the disc gripper device 320 is in the plane of the desired disc 140. The DRU 125 is moved in the direction parallel to the plane of the discs (referred to herein as the "X" direction), so that the gripper is over the desired disc 140. The disc 140 is gripped by the disc gripper device 320 and the DRU 125 is moved in the "X" direction to the center aisle of the high performance optical storage system 100. The DRU 125 is moved in the "Y" direction so that the disc gripper device 320 and disc 140 are in the plane of the disc load position of the desired optical disc drive 130.

In one embodiment, the vertical orientation of the optical disc drive 130, and the opening on the front side 220 (FIG. 2) of the optical disc drive 130 provides clearance for the disc 140 to enter the optical disc drive 130. The openings on the front side 220 and the top side 210 of the optical disc drive 130 provide clearance for the DRU 125 (FIG. 3) and the disc gripper device 320 holding the disc 130 to enter the optical disc drive 130. In one embodiment, the optical disc drive 130 may have openings on both top and bottom, such that the optical disc drive 130 may be used in either vertical orientation (e.g., with the spindle 330 engaging to the right when viewed from the front as in FIG. 4, or with the spindle 330 hub engaging to the left when viewed from the front—the mirror image of FIG. 4.).

Figure 5A:
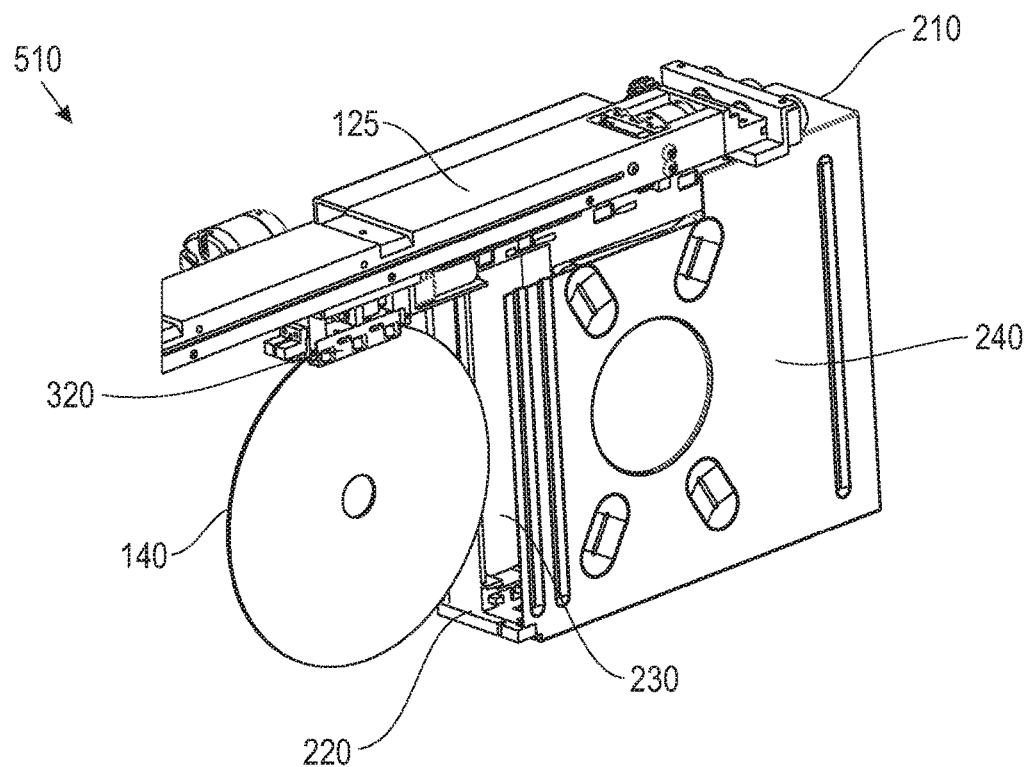
FIG. 5A shows a DRU holding a disc and aligned in front of the optical disc drive of FIG. 2, according to an embodiment.

FIG. 5A shows a view 510 of a DRU 125 holding a disc 140 with a disc gripper device 320 and aligned in front of the optical disc drive of FIG. 2, according to an embodiment. In one example, the DRU 125 is moved in the "X" direction in the high performance optical storage system 100 (FIG. 1) so that the disc 140 is centered at the optical disc drive 130 spindle 330 hub.

Figure 5B:
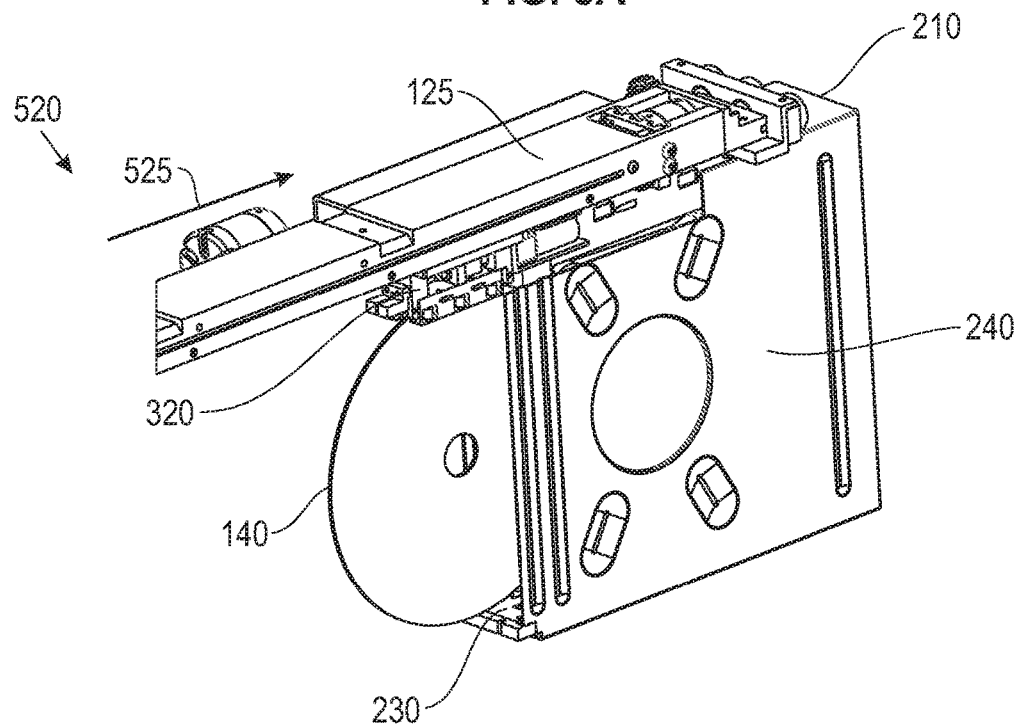
FIG. 5B shows a DRU holding a disc and aligned in front of the optical disc drive of FIG. 2 with a disc gripper device moving towards the optical disc drive, according to an embodiment.

FIG. 5B shows a view 520 of the DRU 125 holding a disc 140 with the disc gripper device 320 and aligned in front of the optical disc drive 130 with the disc gripper device 320 moving towards the optical disc drive 130 in the direction of arrow 525 ("X" direction), according to an embodiment. During the motion of the DRU 125 and disc gripper device 320, the disc 140 enters the optical disc drive 130 through the portion of the contiguous opening 230 at the front side 220 of the optical disc drive 130, and the disc gripper device 320 enters the optical disc drive 130 through the portions of the contiguous opening 230 near the top of the front side 220 of the optical disc drive 130 and along the top side 210 of the optical disc drive 130.

Figure 5C:
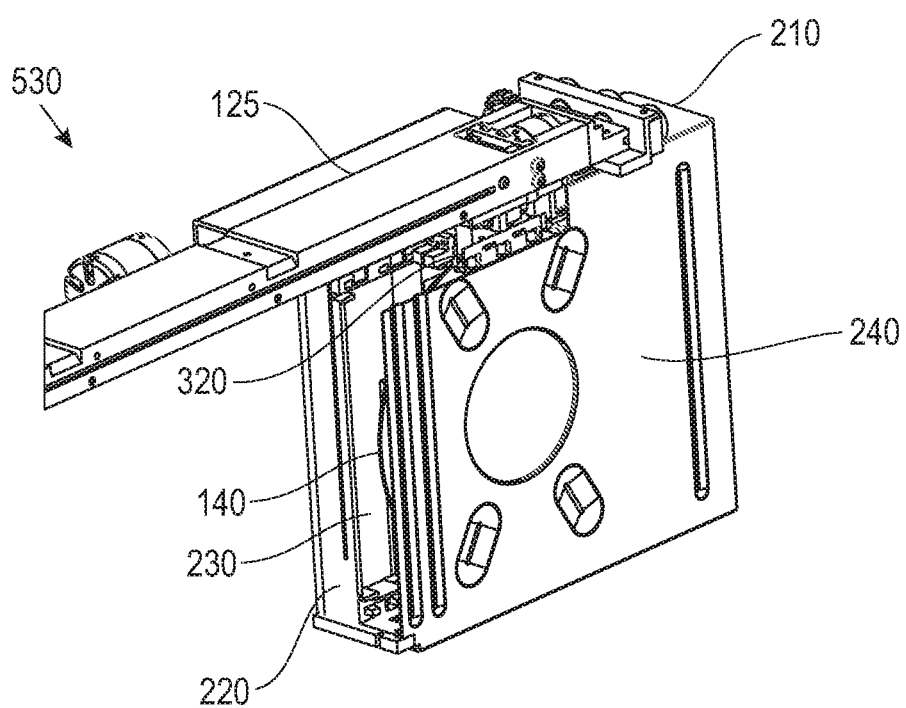
FIG. 5C shows a DRU aligned in front of the optical disc drive of FIG. 2 with a disc loaded into the optical disc drive, according to an embodiment.

FIG. 5C shows a view 530 of the DRU 125 aligned in front of the optical disc drive 130 with a disc 140 loaded into the optical disc drive 130, according to an embodiment. In one example, the disc 140 is loaded into the optical disc drive 130, the disc is un-gripped by the disc device 320, and the DRU 125 then is moved back in the "X" direction to the center aisle of the high performance optical storage system 100 (FIG. 1). The reverse of the sequence of FIGS. 5A-C is used to move a disc 140 from the optical disc drive 130 to a disc cassette 150 storage location in the high performance optical storage system 100.

Figure 6A:
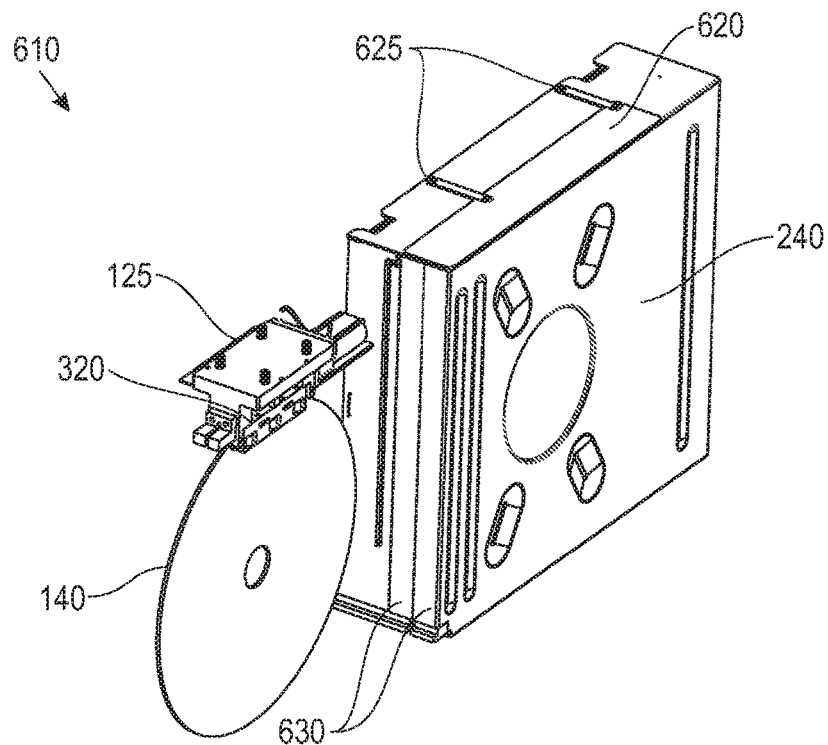
FIG. 6A shows a disc gripper device holding a disc and aligned in front of an optical disc drive that includes doors to control air flow to reduce turbulent disturbances of the optical disc drive, according to an embodiment.

FIG. 6A shows an optical disc drive 610 including top door 620 and front doors 630 to control air flow to reduce turbulent disturbances within the optical disc drive 610, such as disc flutter, optical actuator disturbance, vibration, according to an embodiment. Such disturbances can also lead to increased power dissipation. In one embodiment, the optical disc drive 610 has similar components as the optical disc drive 130 (FIGS. 2-4). In high performance disc drives, such as optical disc drive 130 and 610, the disc 140 spins at a high RPM, which generates considerable air flow around the disc 140. In one embodiment, the top door 620 and front doors 630 control the air flow in the operating optical disc drive 610 to minimize turbulent disturbances within the optical drive 610. In one embodiment, the top door 620 and front doors 630 are movable doors for the contiguous opening 230 to the optical disc drive 610. In one example, the top door 620 and front doors 630 may be made of a rigid material and hinged (for example by the swing hinges 625 for the top door), or made of a flexible material, etc., which does not impede the motion of the disc 140 and disc gripper device 320 through the contiguous opening 230. In one embodiment, the top door 620 and front doors 630 may be opened by contact with a feature on the gripper device 320 or otherwise actuated. In one example, closing force may be applied to the top door 620 and front doors 630 via springs.

As shown in FIG. 6A the disc gripper device 320 is holding a disc 140 and is aligned in front of the optical disc drive 610 that includes the top door 620 and front doors 630 in a closed position. In one example, the top door 620 and the front doors 630 are passive air flow control doors. Both the top door 620 and the front doors 630 have springs to provide a restoring force on closing, and are pushed open by the disc gripper device 320.

Figure 6B:
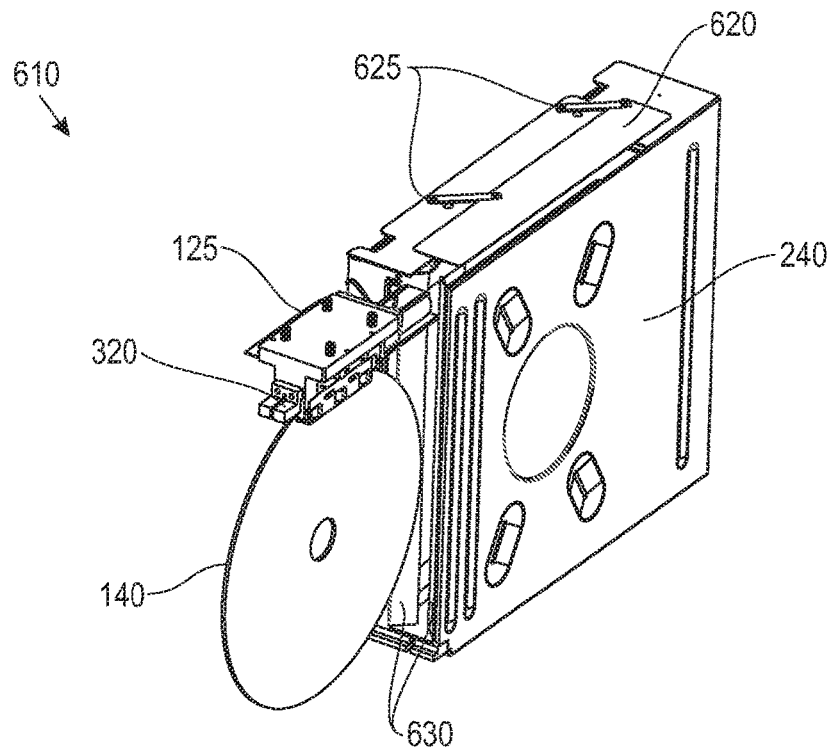
FIG. 6B shows a disc gripper device moving towards the optical disc drive with the doors moving for loading the disc, according to an embodiment.

FIG. 6B shows the disc gripper device 320 moving towards the optical disc drive 610 with the top door 620 and front doors 630 moving for loading the disc 140, according to an embodiment. As shown, the disc gripper device 320 begins to engage the front doors 630. The front doors 630 are split, and swing away to the inside of the optical disc drive 610 as the disc gripper device 320 comes in contact with the front doors 630. This prevents the front doors 630 from touching the disc 140 surface. The disc gripper device 320 also pushes on the top door 620, which swings away in the plane of the top door 620 as the swing hinges 625 start to move. This operation is beneficial because it does not require significant vertical height. Further, the top portion of the contiguous opening 230 does not extend the full length of the top side, thus there is room for the top door 620 door to swing out of the way without extending significantly beyond the borders of the optical disc drive 610.

Figure 6C:
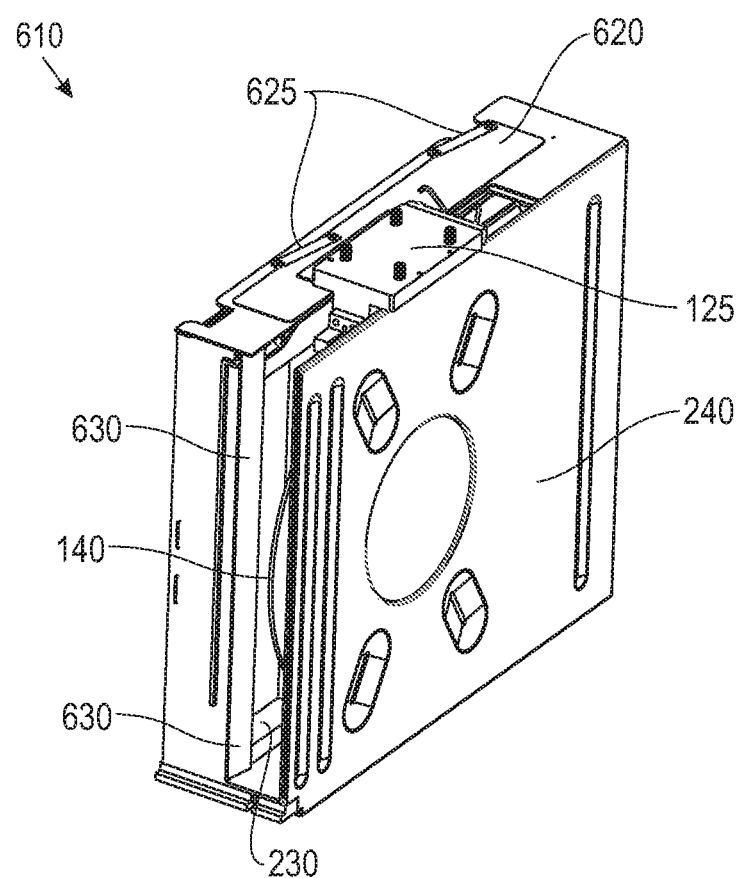
FIG. 6C shows the disc loaded in the optical disc drive with the doors moved out of a contiguous opening, according to an embodiment.
Figure 7A:
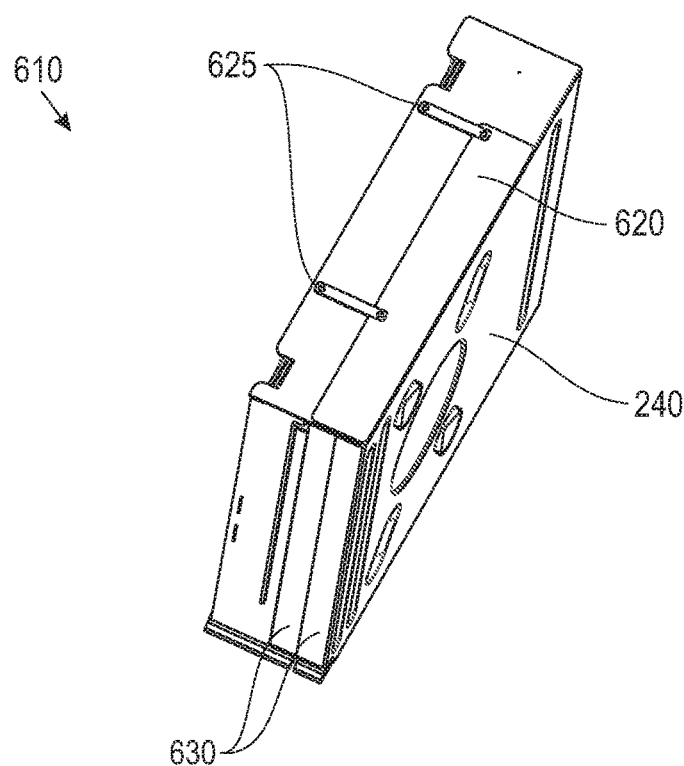
FIGS. 7A-D show the doors of the optical disc drive shown in FIG. 6A transitioning from closed to open for loading a disc, according to an embodiment.
Figure 7B:
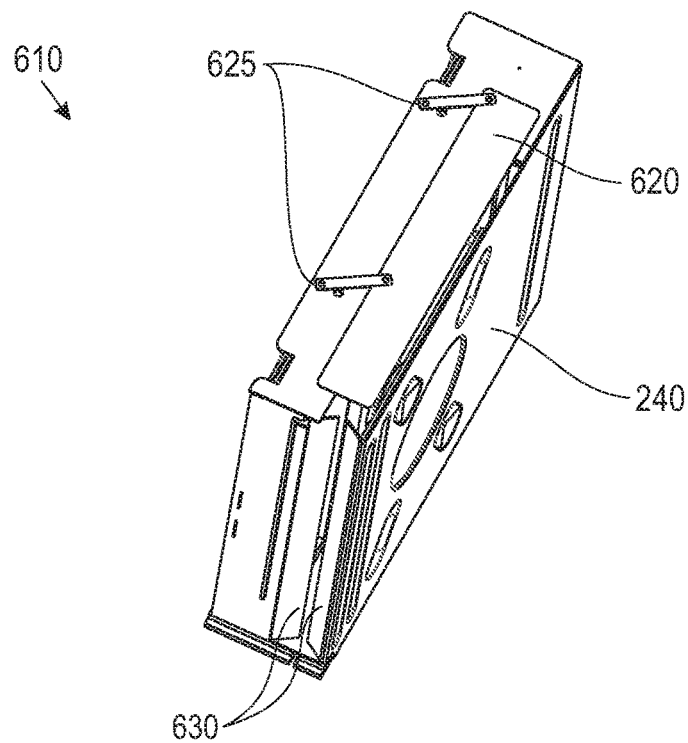
Figure 7C:
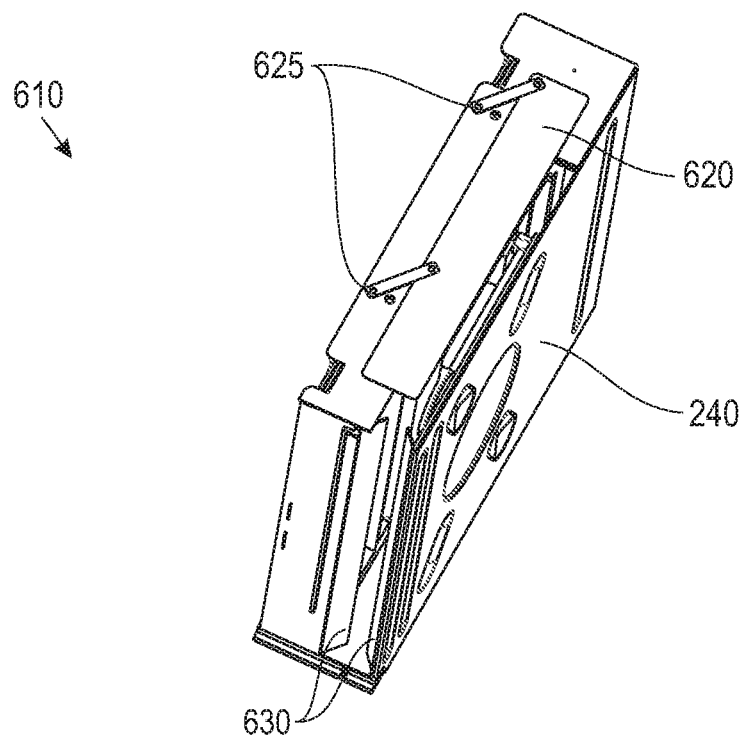
Figure 7D:
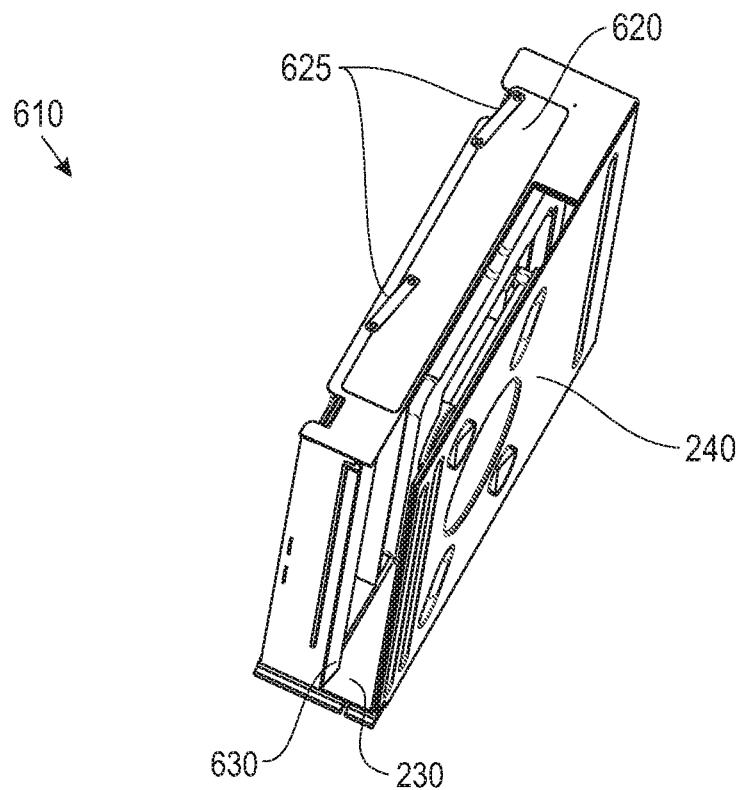

FIG. 6C shows the disc 140 loaded in the optical disc drive of FIG. 6A with the doors moved out of a contiguous opening, according to an embodiment. The configuration occurs when the disc gripper device 320 is at the disc 140 drop-off and pick-up position. Both the top door 620 and front doors 630 are held open by the disc gripper device 320. The top door 620 and the front doors 630 remain open until the disc gripper device 320 retracts into the DRU 125. Once the disc gripper device 320 retracts, the top door 620 and the front doors 630 close by spring tension, thus providing air flow control.

FIGS. 7A-D show the top door 620 and the front doors 630 of the optical disc drive 610 transitioning from closed to open for loading a disc 140, according to an embodiment. As shown, the top door 620 and the front doors 630 motion move into various positions from fully closed to fully open. It should be noted that while the front doors 630 are shown as splitting, the front door 630 may have other configurations, such as a single door, a retractable door, motion actuated based on an optical sensor, etc. It should also be noted that while the top door 620 is shown as a single hinged door, other configuration are possible, such as a slidable door that actuates based on an optical sensor, or a rollup door, etc.

Figure 8:
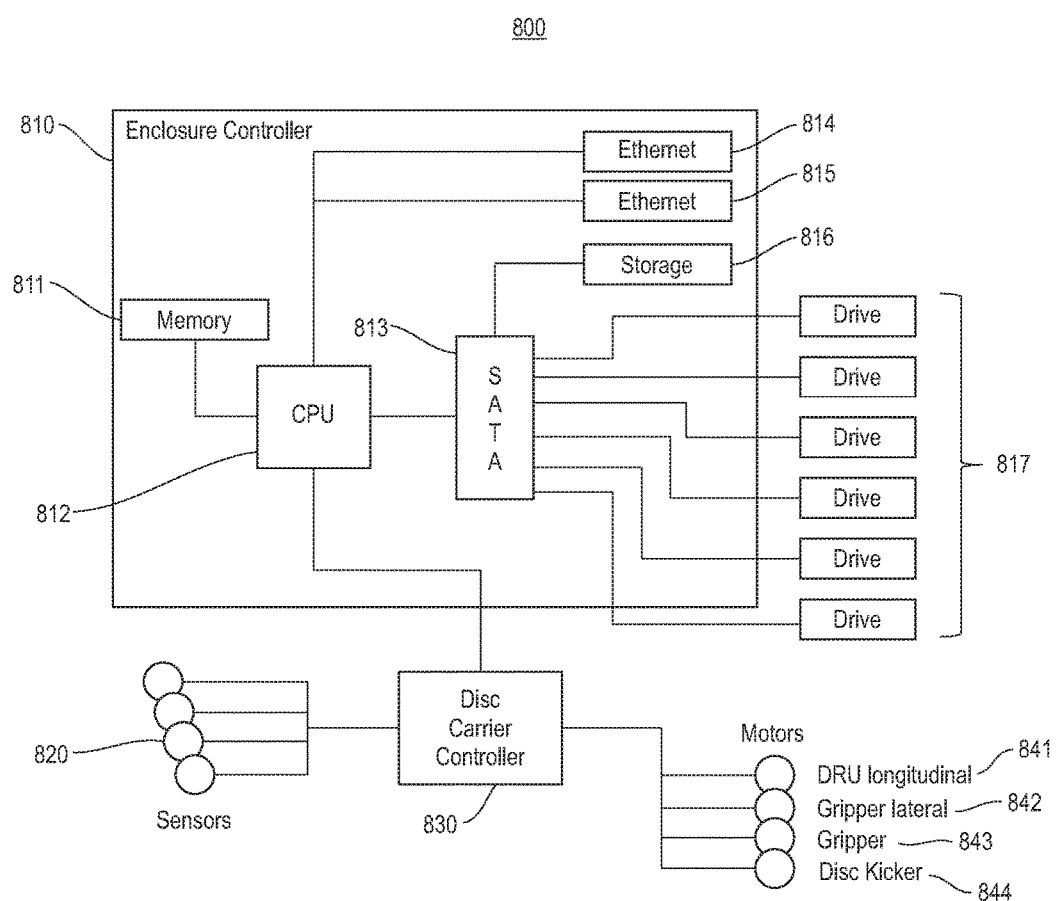
FIG. 8 shows control circuitry and electronics that may be implemented for the optical disc drive of FIG. 2 or FIG. 6A for the high performance optical storage system of FIG. 1, according to an embodiment.

FIG. 8 shows control circuitry and electronics 800 that may be implemented for the optical disc drive 130 (FIG. 2) or 610 (FIGS. 6A-C) for the high performance optical storage system 100 of FIG. 1, according to an embodiment. In one embodiment, optical sensors of the sensor set 820 are used in the system to provide contactless position information for various moving components. In one example, optical sensors of the sensor set 820 on the disc carrier of the DRU 125 combined with the features of the disc cassettes 150 and the optical disc drives 130 allow the disc gripper device 320 to be positioned to within +−0.1 mm. Other sensors of the sensor set 820 are used to sense location of a disc kicker device of the DRU 125, whether a disc (e.g., storage disc 140, FIG. 1) is in the disc gripper device 320, the lateral position of the disc gripper device 320, etc. Sensors of the sensor set 820 may be used in concert with features on the disc cassettes 150 to facilitate positioning of the DRU 125 at disc locations. Other examples include referring to the discs 140 themselves. Similarly, features may be disposed on the enclosure 110 or the optical disc drives 130 (or 610, FIGS. 6A-C) to facilitate accurate positioning of the DRU 125 when loading and unloading discs 140 from the optical disc drives 130 (or 610, FIGS. 6A-C). In another example, transmissive photointerrupter sensors may be utilized for position state sensing of the various components. The motors used in the system may be of the brushless DC type, optionally with shaft encoders to aid in position determination. In one example, the motors may include the DRU 125 longitudinal motor(s) 841, the disc gripper device 320 lateral motor(s) 842, the disc gripper device 320 motor 843, the disc kicker device motor(s) 844, etc.

In one embodiment, the control electronics shown in the control circuitry and electronics 800 are partitioned into a robotic controller (the disc carrier controller 830) on the disc carrier and an enclosure controller 810 otherwise mounted in the enclosure 110 (FIG. 1). The latter does not move, and includes a CPU 812, memory 811 and associated components for running the control software. In one example the control circuitry and electronics 800 includes local storage for holding the operating system and the control software, although in another example may instead boot over a network and load the necessary software, or even boot off the optical media of a disc. In another example, flash memory storage is implemented. The enclosure controller 810 includes both the external interface to a host system or network as well as interfaces (SATA 813, storage interface 816) to the optical disc drives 130 or 610 (FIGS. 6A-C), collectively shown as a set 817. In one example, the external interface may include a network interface, such as Ethernet. In one embodiment, for enhanced reliability, the network interface would include two connections, such as Ethernet connections 814 and 815 with each directed to a separate switch. In another example, a third external interface might be used for system control and monitoring.

In one embodiment, the enclosure controller 810 is responsive to commands over the external interface to load a disc 140 (FIG. 1), read and write data, and perform other operations. In one example, the enclosure controller 810 communicates with the robotic controller (disc carrier controller 830) to send commands, such as to load a selected disc 140 in a selected optical disc drive 130 or 610 (FIGS. 6A-C). The enclosure controller 810 also includes a data buffer for holding read and write data during data transfers.

In one embodiment, the robotic controller (disc carrier controller 830) manages the robotic activities of the high performance optical storage system 100 (FIG. 1), including controlling the motors, reading optical and other sensor data and communicating state information with the enclosure controller 810. In one embodiment, the robotic controller (disc carrier controller 830) communicates with the enclosure controller 810 over a serial interface. The interface may be wired, such as universal serial bus (USB) over a flex cable, or wireless, such as infrared data association (IRDA), BLUETOOTH®, etc. In one example, on initialization, it is critical for the disc carrier controller 830 to determine the physical state of the high performance optical storage system 100 to prevent damage. If the high performance optical storage system 100 has undergone a controlled shutdown, this state information may be recorded within the library. Even so, this shutdown state needs to be confirmed. The high performance optical storage system 100 may have been powered down in an unknown state, such as by an unintended power loss. For example, before the DRU 125 can move longitudinally, the high performance optical storage system 100 must determine if a disc 140 is in the disc gripper device 320 and if so, position the disc gripper device 320 within the drive carrier prior to a longitudinal move. In one embodiment, the sensors set 820 includes sensors to detect if the disc gripper device 320 is centered, or to the left or right of center. Thus, the disc gripper device 320 can be moved directly to the center position. Similarly, sensors of the sensor set 820 are provided to determine if the disc kicker device is centered, or to the left or right of center. Once both disc gripper device 320 and disc kicker device are centered, the DRU 125 may be moved longitudinally. All these functions are accomplished through means of the set of sensors 820. In one embodiment, optical sensors are used to make the positon determinations.

In one embodiment, the high performance optical storage system 100 (FIG. 1) determines if discs 140 are located within any of the optical disc drives 130 or 610 (FIGS. 6A-C). The optical disc drives 130 or 610 may be queried to see if a disc 140 is loaded and spindle 330 (FIG. 3) of an optical disc drive 130 or 610 is clamped by the clamp 340. It is possible for a disc 140 to remain in an optical disc drive 130 but not be clamped by the spindle 330. This can be tested by attempting a clamp operation.

In one embodiment, an inventory manger is implemented that includes metadata for each disc 140 (FIG. 1) in the high performance optical storage system 100. In one example, the metadata may include the media type, bad block table or other initialization information, location of the disc within the enclosure 110, etc. The high performance optical storage system 100 can transmit this initialization information to an optical disc drive 130 or 610 (FIGS. 6A-C) upon the load operation, which substantially shortens the startup time. The inventory manager also queries the optical disc drive 130 or 610-630 on unload to obtain updates to the media.

In one example, metadata, such as changes in the bad block information, is stored by the inventory manager in nonvolatile storage which may be external to the high performance optical storage system 100 (FIG. 1). Any system metadata can be periodically flushed to specific locations on the media in the library to create self-described system state, such as for relocating a system. Alternatively, the metadata may be stored on other nonvolatile media in the enclosure controller 810.

In one embodiment, the high performance optical storage system 100 (FIG. 1) software includes a library executive, which is responsive to read, write, mount and dismount commands from a host system. The library executive forwards mount and dismount commands and information to the disc carrier controller 830. The mount command information includes the disc location in the disc cassette 150 to select and the optical disc drive 130 or 610 (FIGS. 6A-C) to load. The dismount command information includes information on the optical disc drive 130 or 610 to unload and the target location for storing the disc 140 in the disc cassette 150.

As will be appreciated by one skilled in the art, aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. An optical disc drive comprising:
a spindle coupled to an optical assembly;
a disc clamp device configured to hold an optical disc on the spindle; and
a contiguous opening on a portion of at least two adjacent sides in a plane of a disc mount position and intersecting at a common corner of the optical disc drive, wherein the at least two adjacent sides include a front side and a top side of the optical disc drive.

2. The optical disc drive of claim 1, wherein the spindle and the optical assembly are movable to engage the disc clamp device that is constrained by a cover assembly.

3. The optical disc drive of claim 1, further comprising at least one movable door coupled to a portion of the cover assembly, wherein the at least one movable door is configured to open for loading an optical disc through the contiguous opening.

4. The optical disc drive of claim 1, wherein the spindle and optical assembly are fixed and the disc clamp device is movable to engage the spindle to clamp an optical disc.

5. The optical disc drive of claim 1, wherein the contiguous opening is covered by at least one hinged or flexible door.

6. The optical disc drive of claim 2, further comprising:
one or more moveable doors coupled to the cover assembly over the contiguous opening, wherein the one or more moveable doors are configured to control air flow to reduce turbulent disturbances in the optical drive.

7. An optical disc drive comprising:
a spindle coupled to an optical assembly;
a disc clamp device configured to hold an optical disc on the spindle; and
a cover assembly having a contiguous opening on a portion of the optical disc drive, wherein the contiguous opening comprises a front opening portion and a top opening portion that intersect at a common corner of the optical disc drive.

8. The optical disc drive of claim 7, wherein the spindle and the optical assembly are movable to engage the disc clamp device that is constrained by the cover assembly.

9. The optical disc drive of claim 7, further comprising at least one movable door coupled to a portion of the cover assembly, wherein the at least one movable door is configured to open for loading an optical disc through the front opening.

10. The optical disc drive of claim 7, wherein the spindle and the optical assembly are fixed and the disc clamp device is movable to engage the spindle to clamp an optical disc between the spindle and the disc clamp device.

11. The optical disc drive of claim 7, wherein the cover assembly is coupled to a hinged or flexible door configured to control air flow for at least one of the front opening and the top opening to reduce turbulent disturbances in the optical drive.

12. An optical disc drive comprising:
an optical assembly;
a spindle coupled to the optical assembly;
a disc clamp device configured to vertically hold an optical disc on the spindle; and
a cover assembly having a contiguous opening on a portion of the optical disc drive including a front side and a top side, wherein the contiguous opening comprises a front opening portion and a top opening portion that intersect at a common corner of the optical disc drive.

13. The optical disc drive of claim 12, wherein the spindle engages the disc clamp device that is constrained by the cover assembly.

14. The optical disc drive of claim 12, further comprising at least one movable door coupled to a portion of the cover assembly, wherein the at least one movable door is configured to open for loading an optical disc through the front opening, the optical assembly is fixed, and the disc clamp device is movable to engage the spindle to clamp a disc between the spindle and the disc clamp device.

15. The optical disc drive of claim 12, wherein the cover assembly is coupled to a hinged or flexible door configured to cover at least one of the front opening and the top opening to control air flow to reduce turbulent disturbances to the optical assembly.

* * * * *